R. V. BLAKE.
METHOD AND APPARATUS FOR COOKING EGGS.
APPLICATION FILED JULY 27, 1916.
1,213,148.
Patented Jan. 23, 1917.
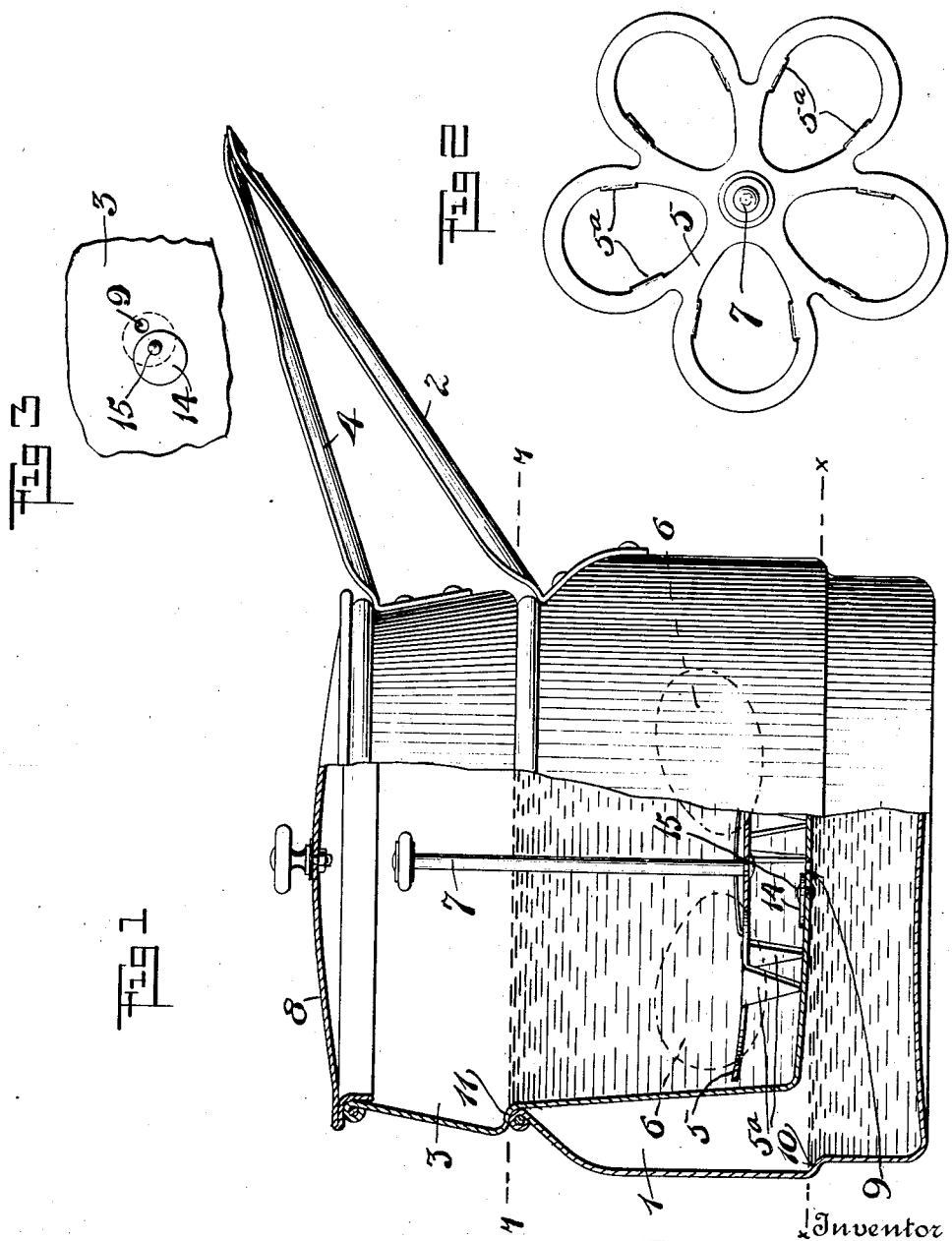
Inventor
Ralph V. Blake
By his Attorneys

UNITED STATES PATENT OFFICE.

RALPH V. BLAKE, OF YONKERS, NEW YORK.

METHOD AND APPARATUS FOR COOKING EGGS.

1,213,148.  Specification of Letters Patent.  Patented Jan. 23, 1917.

Application filed July 27, 1916. Serial No. 111,664.

*To all whom it may concern:*

Be it known that I, RALPH V. BLAKE, a citizen of the United States of America, residing at Yonkers, Westchester county, New York, have invented a new and useful Method and Apparatus for Cooking Eggs, of which the following is a specification.

My invention relates to an improved cooking utensil, particularly designed to cook eggs to the so-called soft boiled consistency.

The object of the invention is to provide an exceedingly simple apparatus for the above purpose which will operate in such a manner as to relieve the cook of the necessity of watching the clock during the cooking period. The construction is such that the cooking is checked at some predetermined time, for example, at the end of three and one-half minutes. By my improvement, the eggs are uniformly cooked to the desired soft boiled consistency and when said stage is reached, the further cooking of the egg will be substantially suspended and yet the egg will be caused to retain its heat for quite a substantial period.

In the drawings: Figure 1 is a vertical section of my improved egg cooker. Fig. 2 is a plan view of a detail. Fig. 3 is a fragmentary view of certain details.

1 is a receptacle which may have the usual handle 2. 3 is a receptacle of smaller proportions adapted to project partially into the receptacle 1. This receptacle 3 may have a handle 4. The bottom of the receptacle 3 is suspended somewhat above the bottom of the receptacle 1 when the two receptacles are assembled, as shown in Fig. 1.

5 is a hopper or holder upon which may be supported the eggs 6—6. The holder may have a handle 7 for convenience in removing the eggs, and it may also have legs 5ª.

8 is the usual removable top for the receptacle 3.

In the bottom of the receptacle 3 is a small outlet 9.

In operation: The receptacle 1 is first partially filled with water of the normal temperature, said receptacle 1 being filled to approximately the level indicated in dotted lines $x$—$x$, which brings the cool water approximately to the bottom of the receptacle 3. If desired, the receptacle 1 may have an inturned shoulder 10 to indicate approximately the level for the cool water. The receptacle 3 is then inserted and the eggs 6—6 placed in the bottom thereof. Boiling water is then poured into the receptacle 3 to a level well above the top of the eggs. In this instance, it may be assumed that the shoulder 11 at the dotted line $y$—$y$ indicates the proper level for the boiling water. The cover 8 is then applied. The boiling water in the receptacle 3 will slowly pass through the outlet 9 into the outer receptacle 1, where the cooler water therein will reduce the temperature thereof. By the time a common level between the water in the receptacle 3 and the water in the receptacle 1 has been reached, the eggs will be adequately cooked. By that time, the temperature of the water in the receptacle 3 has been so far reduced by conduction to the cooler mixture surrounding said receptacle that the further cooking of the eggs will practically cease, but the water will still be warm enough to maintain the cooked eggs in a warm condition, so that even if they are not to be removed for several minutes, they will still be found to be in the proper condition for consumption.

It should be understood of course, that the outlet 9 should be so proportioned as to allow the water to escape at the proper speed to effect the desired degree of cooking, and, of course, the filling points in the respective receptacles should be so placed as to coöperate with the relative size of the opening 9 for the same purpose. Therefore, it should be understood that the drawings are merely illustrative, and that these conditions could vary with different sized receptacles, and by the varying of the diameter of the outlet 9. The egg holder or tray 5 may be made of any suitable material, that is to say, may be made of sheet metal or wire. Indeed, the presence of a holder is merely preferred, since it furnishes a convenient means for depositing the eggs in and removing the same from the cooking receptacle.

My invention also comprehends a new process for cooking an egg which comprises subjecting an egg to the cooking action of boiling water and simultaneously reducing the temperature of said boiling water at greater speed than would occur by mere atmosperic radiation, or by the capacity of the egg to absorb the heat thereof; whereby, not only will the egg be cooked to the desired degree, but, after being cooked to that degree, any substantial further cooking will be checked while the egg will still continue to remain in a heated state for a very considerable period by reason of being immersed in water of substantial warmth.

In Fig. 3 I have shown part of the bottom of the receptacle 3, and I have shown attached thereto, friction tight, a round plate 14, the edge of which is eccentric to the pivot 15 so that by rotating said plate the edge of the same will partially or entirely cover the outlet 9. Thus, the receptacle 3 by closing said outlet, may be adapted for ordinary boiling purposes as performed in the so-called "double boiler". The plate 14 also constitutes a valve by which the size of the outlet passage 9 may be varied, should occasion require.

If the water introduced into the bottom of the receptacle is very cold, as in winter, the cook would very naturally and properly use a little less water in said receptacle 1 than in the summer time when the temperature is higher, assuming, of course, the size of the outlet passage 9 is non-adjustable. Of course, if I should provide an adjusting valve in commercial devices, the user could adjust the size of the outlet 9 so that the boiling water would be discharged more slowly if the water in the receptacle 1 were very cold. In the use of such devices, however, it is expected that a cook will exercise ordinary judgment in meeting the various conditions that obtain in cooking.

What I claim is:

1. An egg cooking apparatus comprising an egg receiving vessel, a second vessel surrounding the lower part thereof and in which the former is mounted in a fixed position and spaced-apart from the bottom and side wall thereof, a small outlet passage from the former to the latter whereby hot water placed in the first vessel may pass slowly into cold water placed in the second vessel to cause the level of water in the second to rise up around the sides of the first to cool the latter, the capacity of the first vessel and its arrangement being such relatively to the space under and around the same that the water in the first vessel can not wholly escape therefrom but will be retained therein to partially or wholly cover any eggs contained therein after cooking has ceased.

2. The method of cooking an egg which comprises applying boiling water to an egg in a receptacle and applying to the outside of said receptacle a cooling medium for reducing by conduction the temperature of said water to below the boiling point at a predetermined speed to control the cooking of the egg.

RALPH V. BLAKE.